United States Patent
Morphew et al.

[15] 3,643,217
[45] Feb. 15, 1972

[54] AUTOMATIC VISUAL AID CONTROL UNIT

[72] Inventors: James R. Morphew, 2513 Lakeside, Garland, Tex. 75040; Roland D. Ingram, 329 Brookview Drive, Hurst, Tex. 76053; John R. Stokes, 3004 Dyer St., Dallas, Tex. 75205

[22] Filed: Oct. 10, 1968

[21] Appl. No.: 766,526

[52] U.S. Cl.............................340/147 P, 340/335, 352/40, 352/133
[51] Int. Cl......................................................H04q 9/02
[58] Field of Search......................352/133, 179, 244, 38, 40, 352/41; 240/9, 92; 340/335, 163, 162, 147, 171, 147 C, 151, 164, 327 A, 147 P

[56] References Cited

UNITED STATES PATENTS 3,096,507  7/1963  Harms et al.............................340/147
3,384,888  5/1968  Harnden, Jr. et al. ..............340/147 X Primary Examiner—John W. Caldwell
Assistant Examiner—Glen R. Swann, III
Attorney—Watson, Cole, Grindle & Watson

[57] ABSTRACT

An all-electronic control system for simultaneously operating a plurality of visual aid components and/or a lighting system is operated from a programmed input tape to provide diverse control functions such as on, off, fade-in, fadeout, etc. The exclusive utilization of fast-switching, solid-state components in diverse control, slide change and movie projector control circuits enables several diverse commands to be executed nearly simultaneously.

8 Claims, 7 Drawing Figures

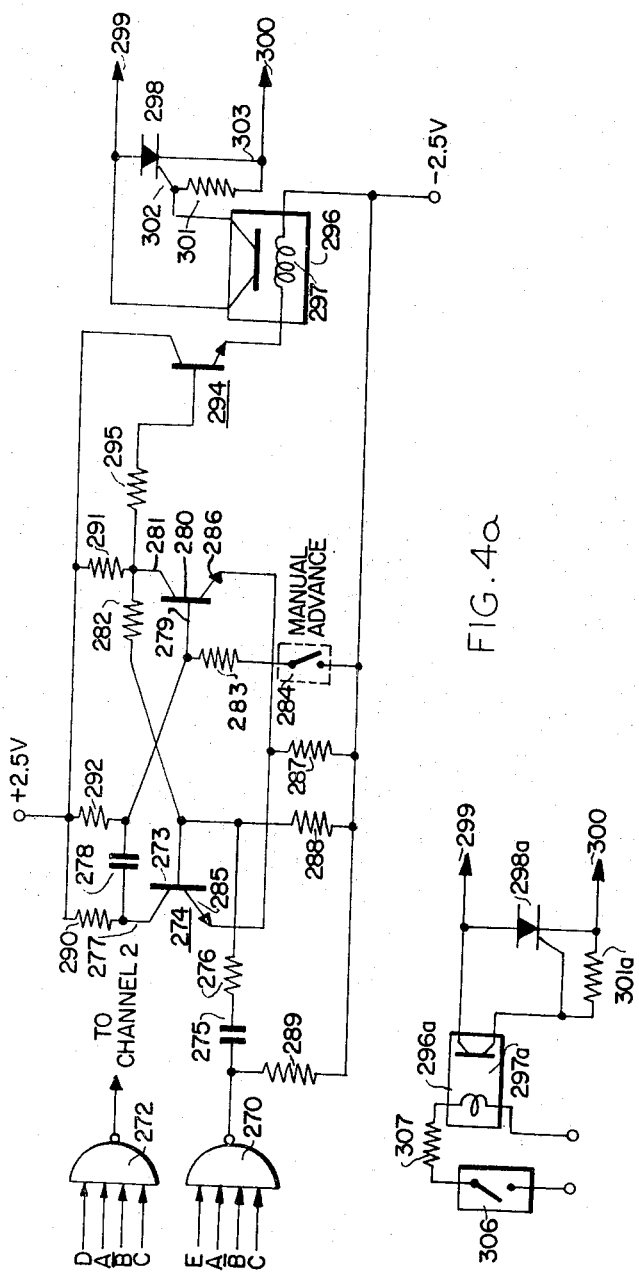
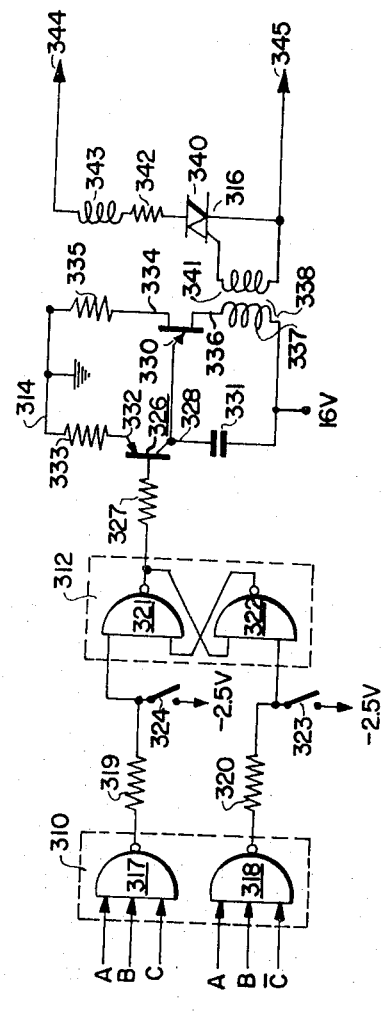
FIG. 4a
FIG. 4b
FIG. 5
INVENTORS
JAMES R. MORPHEW
ROLAND D. INGRAM
JOHN R. STOKES
BY Watson, Cole, Grindle & Watson
ATTORNEYS

3,643,217

AUTOMATIC VISUAL AID CONTROL UNIT

BACKGROUND OF THE INVENTION

This invention relates to programmable control equipment and more particularly to automatic control apparatus for simultaneously operating plural channel lighting or visual aid presentation systems. The control apparatus automatically effects fade-in, fadeout, on/off switching of slide projectors and movie projectors, or to automatically control stage and/or display lighting systems.

Automatic control equipment for the operation of lighting or visual display systems are well known to the art and have usually employed electromechanical components. Such automatic control equipment must be capable of simultaneously operating a plurality of channels which provide separate command signals for controlling various and diverse lighting equipment or visual display equipment such as slide projectors.

SUMMARY OF THE INVENTION

The automatic control circuitry of this invention is composed of linear, analog and digital electronic circuits incorporating fast switching semiconductor devices. The extensive use of solid-state components significantly increases the reliability of the automatic control system beyond that of similar devices which may contain vacuum tubes and electromechanical components exclusively. The only electromechanical component in this system is the program input which may be, for example, a paper tape reader.

The automatic control system in accordance with this invention can by any one command switch on or off any combination of one, two, three, four or five slide projector units, lamps, banks of stage display lights, or an admixture of projectors, lights, etc. The control circuitry may also fade-in the lamps of any combination of one, two, three, four or five slide projectors or banks of stage and display lights. The fade-in is manually adjustable from approximately ½ to 50 seconds. The control circuitry may also fadeout the lamps of any combination of one, two, three, four or five slide projectors or banks of display lights with the fadeout period being manually adjustable from approximately ½ to 50 seconds. The control circuitry may also change slides of any combination of one, two, three, four or five slide projector or similar projector units. The control circuitry may additionally automatically turn on or off a single movie projector, slide projector lamp, bank of lamps or close or open curtains.

While the invention is to be described using six channels, it is readily apparent that the features of the control system may be extended to as great a number of control channels as may be required by the particular system of interest.

The logic circuitry incorporated in the inventive control design is composed of integrated circuits and other high-frequency solid-state devices which have extremely short response times. The use of such circuits coupled with a relatively fast reading tape reader enables the reception and execution of commands so rapidly that several commands that could not be visually detected from that of a single command may be executed stepwise in rapid order and yet the functions would actually appear to be simultaneous in operation.

A primary object of the invention is to provide an automatic control system for controlling lighting equipment and/or visual aid systems by all-electronic circuitry.

A further object of the invention is to provide an all-electronic automatic control system of the type specified which has increased reliability over presently existing systems.

Another object of the invention is to provide a fully automatic control system of the type specified which has the capability of providing simultaneous control of divergent functions over a plurality of channels.

And yet another object of the invention is to provide fade-in and fadeout operation for lighting equipment and/or visual aid systems which is fully automatic and highly reliable.

In accordance with the invention the automatic control circuitry operates under the direction of a command program which may, for example, be placed upon tape to be read by a tape reader. The system accepts a specified audiofrequency tone which may be recorded on an audio tape to actuate the stepping and interrogation for the tape reader. The coded signals on the tape are transmitted through the appropriate contacts of the reader circuit, that are closed in accordance with a specific code, to the various channels by specific logic circuits for interpreting the code. The individual channel logic circuits then select the control circuits to perform the desired function such as on, off, fade, change slides, etc. The necessary switching to accomplish the desired functions is accomplished by means of silicon control rectifiers and triacs without the necessity of using electromechanical relays.

Input circuitry to the system includes tape advance and interrogate circuitry which mainly includes signal filtering and signal conditioning circuits, tape reader advance circuits and the tape reader interrogation circuit. The input to the tape advance and read section is a tone having a frequency which is recorded in approximately 80 millisecond bursts. The tone bursts are applied to the input of an active band-pass filter which includes an operational amplifier having a differentiator on the input and a Twin-Tee band-reject filter in the feedback path. The tone burst is amplified and passed on to a diode pump circuit which charges a capacitor to activate transistor switches when a prespecified voltage level has been attained. The transistor switches activate a monostable multivibrator interrogate circuit and a monostable multivibrator tape advance circuit. The output of the interrogate multivibrator circuit feeds through the read contacts of the tape reader to specific logic drive circuitry that interprets the code on the programmed tape. The output of the tape advance multivibrator triggers the advance mechanism of the tape reader, advancing the tape to the next command.

The control circuitry includes a dimmer circuit in each channel for controlling the intensity of a light or lamp. The pulses from the tape reader are fed into appropriate logic circuitry which controls the operation of a group of RS flip-flops. The RS flip-flops each respectively control a transistor switch which provides a parallel input through an operational amplifier which integrates each of the transistor switch outputs. The inverting input of the operational amplifier provides a smoothly varying voltage output and the input to the noninverting input of the amplifier provides a snap-action, on-off switching function that may be used to control a lamp. The output voltage excursions of the integrator are then fed into another operational amplifier to provide the necessary sensitivity to operate a transistor switch. The transistor acts as a variable impedance in a conventional unijunction trigger circuit of a SCR or triac phase-controlled switch.

A further feature of the invention resides in a slide change circuit which includes a gate activated upon the reception of a proper code to trigger a monostable multivibrator. The monostable multivibrator pulse output operates a driver to turn on a lamp in a Clairex photocell lamp module which in turn controls a SCR to advance the slide tray of a projector. A pushbutton switch is provided to reverse the operation of the slide tray.

An additional feature of the invention includes a movie projector control circuit which receives command signals from the tape reader. The command signals are fed to a number of on-off gates which control the operation of a RS flip-flop to latch a transistor in either an "on" or "off" state. The conduction of the transistor controls a unijunction oscillator which operates a triac switch to control the movie projector.

BRIEF DESCRIPTION OF THE DRAWINGS

The following description of a preferred embodiment of the automatic control system is provided with reference to the accompanying drawings wherein:

FIG. 4A is a schematic representation of a preferred embodiment of the slide change circuit;

FIG. 4B represents a manually operable reversing circuit for operation of a slide tray;

FIG. 5 is a schematic representation of a preferred embodiment of the movie projector control circuitry.

DESCRIPTION OF PREFERRED EMBODIMENT

Figure 1:
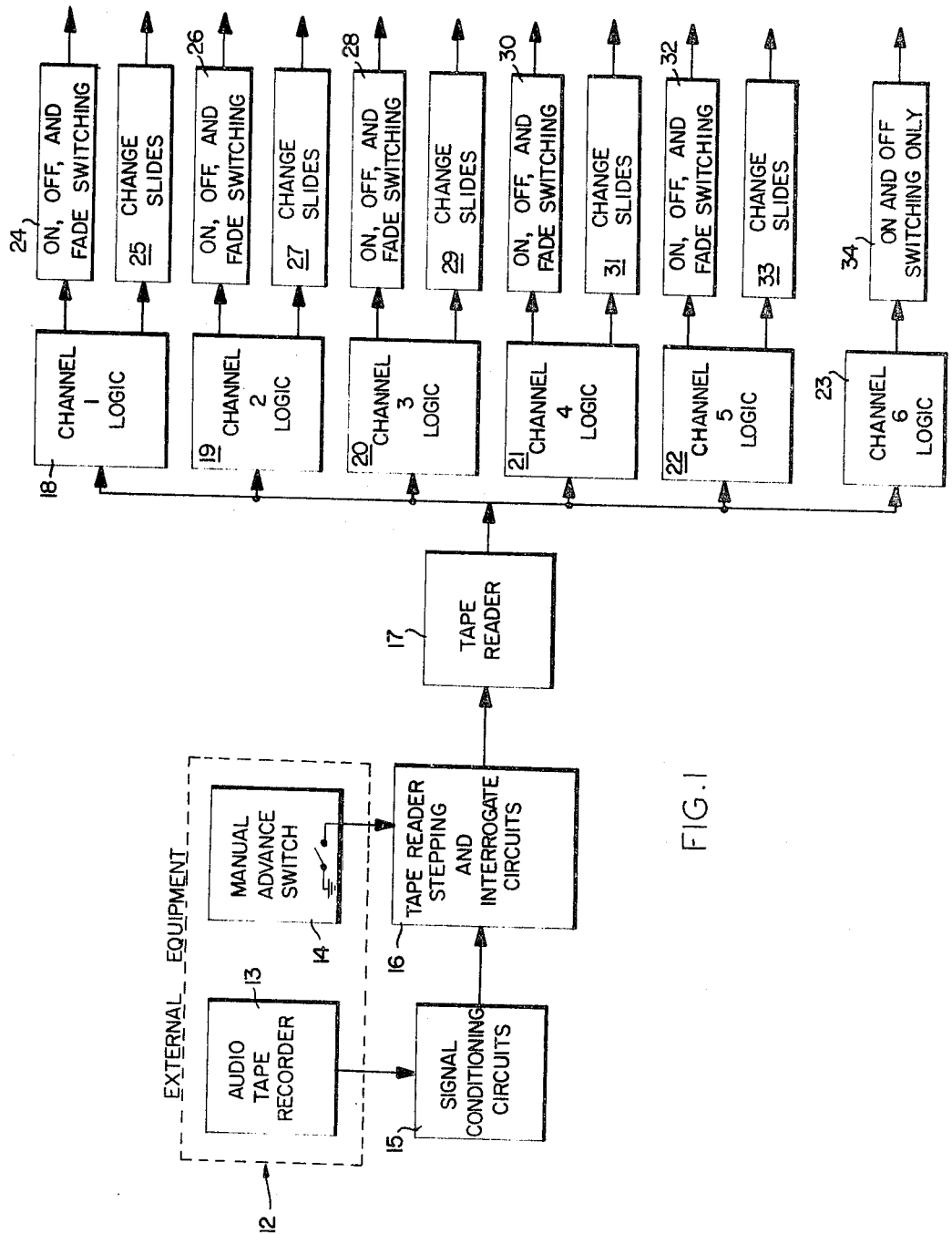
FIG. 1 is a block diagrammatic illustration of the elements of the control system.

The automatic control circuitry requires external equipment, generally designated by the numeral 12, consisting of audio tape recorder 13 and a manual advance switch 14 to provide control inputs for the operation of the system. A specified audio frequency tone is recorded on the audio tape in bursts of approximately 80 milliseconds. The control system can also be actuated by operation of the manual advance switch or, if desired, the recorder signal 13 and manual advance switch 14 may be used in conjunction with each other as will be more fully described hereinafter.

Signal conditioning circuits 15 provide the necessary shaping and amplification of the pulse bursts of information from audio tape recorder 13 to operate the tape reader stepping and interrogate circuits 16. The latter mentioned circuits may also be operated by activation of manual advance switch 14. Stepping and interrogate circuits 16 provide the necessary control signals to coordinate the operation of tape reader 17 so that the coded information thereon may be successively received and interpreted by the logic circuitry of the system. Tape reader 17 is preferably a Tally Corporation Model 625, or equivalent, which is an eight-channel unit having a stepping response of 25 milliseconds. Tape reader 17 is interrogated before it steps the tape by a 200 microsecond pulse from tape reader stepping and interrogate circuit 16. The interrogation pulse is transmitted through the closed contacts of the tape reader to the various channels and their respective logic circuits 18–23 that are indicated by the code on the tape input. The individual channel logic circuitry then selects and activates the circuits to perform the desired functions of on, off, fade, change slides, etc.

As indicated in FIG. 1, a preferred embodiment of the invention includes six control channels 18–23 with appropriate logic circuitry to control the various switching functions indicated by blocks 24–34. In the embodiment shown in FIG. 1, channels 18–22 each include switching circuitry to perform the control functions of on, off, fade switching, and changing of slides. The remaining channel 23 performs the functions of on and off switching only.

Figure 2:
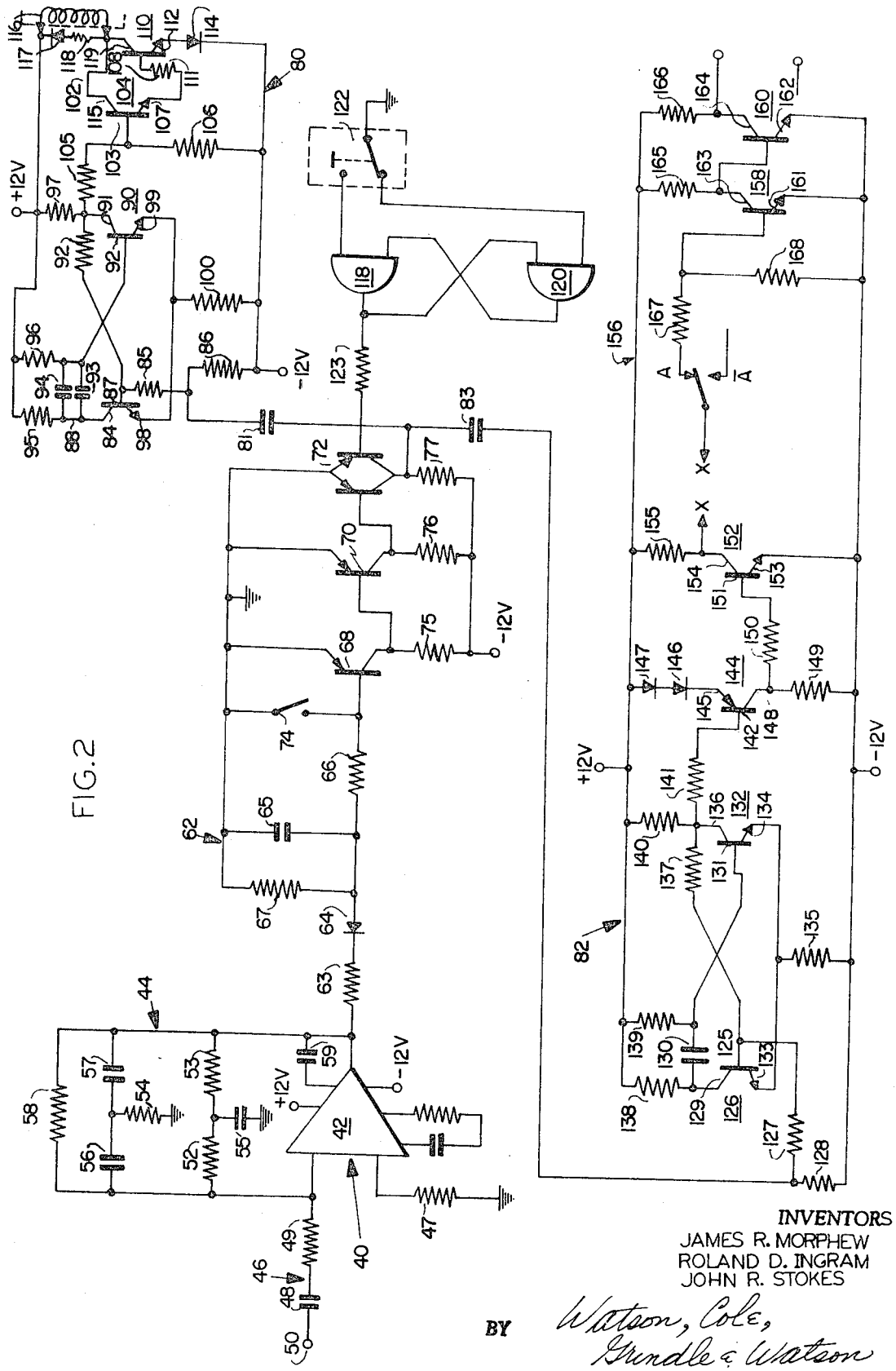
FIG. 2 is a schematic representation of the tape advance and read control circuitry.

FIG. 2 illustrates a detailed schematic of a preferred embodiment of signal conditioning circuits 15 and tape reader stepping and interrogate circuits 16. As mentioned previously, the input to the tape advance and read section is a tone whose frequency has been chosen in advance and recorded on a magnetic tape recorder in approximately 80 millisecond bursts. The tone bursts are applied to the input of active bandpass filter 40. Amplifier-filter 40 consists of operational amplifier 42, Twin-Tee band-reject filter 44 in the feedback path of the amplifier and differentiator 46 which consists of series connected capacitor 48 and resistor 49. The other input of amplifier 42 is connected to ground by means of resistor 47. Twin-Tee network 44 consists of resistors 52, 53, 54 and capacitors 55, 56, 57 which are connected as shown in FIG. 2 in accordance with well-known principles governing the operation of Twin-Tee filter networks. Resistor 58 is shunted across one arm of the Twin-Tee consisting of capacitors 56 and 57. Resistor 58 and capacitor 59 prevent oscillation of amplifier 42. The amplifier is provided with positive and negative voltages as indicated in FIG. 2.

The output of amplifier 42 is fed to diode pump circuit 62 via resistor 63. The periodic cycle of the tone bursts amplified by amplifier 42 charges capacitor 65 through diode 64 until the voltage level of the capacitor is approximately 0.6 volts at which time transistor switches 68, 70, 72 are turned on via resistor 66. Switch 74 connected to the base of transistor 68 provides a means for inhibiting the operation of the tape advance and interrogate circuits since when it is closed it prevents capacitor 65 from charging. The respective collector electrodes of transistor switches 68, 70 and 72 are connected to negative 12-volt power supply by their respective collector resistors 75, 76 and 77. The respective emitters of the aforementioned transistor switches are connected to ground.

The pulsed output from transistor switches 68, 70 and 72 resulting from the charging of capacitor 65 is provided to tape advance circuit 80 via connecting capacitor 81 and to multivibrator interrogate circuit 82 via capacitor 83. Tape advance circuit 80 and multivibrator interrogate circuit 82 are triggered simultaneously; however, the pulse duration of interrogate multivibrator 82 is 0.2 milliseconds whereas the tape advance multivibrator pulse duration is slightly greater than 25 milliseconds. The pulse input to tape advance circuit 80 is fed to the base of transistor 84 via the voltage divider formed by resistors 85 and 86 connecting the base electrode to the negative 12-volt power supply. Base electrode 87 is cross-coupled to collector 91 of transistor 90 via resistor 92, and base electrode 92 of transistor 90 is cross-coupled to collector 88 of transistor 87 by the paralleled connection of capacitors 93 and 94. Additionally, collector electrode 88 is connected to the plus 12-volt power supply via resistor 95 and base electrode 92 and collector electrode 91 are also returned to the positive 12-volt power supply via resistors 96 and 97, respectively. Emitters 98 and 99 are returned to the negative 12-volt power supply by means of resistor 100.

The operation of multivibrator formed by transistors 84 and 90 controls the operation of amplifier 102 by means of the connection of base 103 of transistor 104 to the collector output 91 by means of resistor 105. Base 103 is connected to the negative 12-volt power supply through resistor 106 and emitter 107 of transistor 104 is connected to base 108 of transistor 110 via resistor 111. Emitter 112 of transistor 110 is connected to the negative 12-volt power supply through diode 114. Tally tape advance coil 116 is connected to collectors 115 and 119 of transistors 104 and 110, respectively, to provide the necessary excitation to advance the tally tape unit. Diode 117 and resistor 118 connected in parallel across coil 116 damp the coil to prevent excessive flyback voltages.

Cross-coupled NAND-gates 118, 120 provide a means for manually advancing the tally recorder by means of switch 122. The output of the cross-coupled NAND gates is connected to the base of transistor switch 72 via resistor 123. Activation of switch 122, aside from advancing the tape, also provides a pulse excitation to the multivibrator interrogate circuit 82.

The pulse input to multivibrator interrogate circuit 82, either from transistor switches 68, 70, 72 or by the activation of switch 122, is fed to base 125 of transistor 126 via the divider network formed by resistors 127 and 128 which connect base 125 to the negative 12-volt power supply. Collector 129 of transistor 126 is cross-coupled via capacitor 130 to base 131 of transistor 132. Emitter electrodes 133, 134 of transistors 126 and 132 are connected to the negative 12-volt power supply via common resistor 135. Base 125 is connected to collector electrode 136 of transistor 132 via resistor 137. Collector 129, base 131 and collector electrode 136 are returned to the positive 12-volt power supply via resistors 138, 139 and 140, respectively. The output of the multivibrator formed by transistors 126 and 132 is taken from collector electrode 136 via resistor 141 and applied to base 142 of transistor 144. Emitter electrode 145 of transistor 144 is connected to the positive 12-volt power supply via series connected diodes 146 and 147. Collector electrode 148 of transistor 144 is connected to the negative 12-volt power supply through resistor 149; and, the output of transistor 144 is taken from collector electrode 148 via resistor 150 and applied to base 151 of transistor 152. Emitter electrode 153 of transistor 152 is connected directly to the negative 12-volt power supply and collector electrode 154 of the same transistor is connected to the positive 12-volt power supply through resistor 155. The output of the multivibrator interrogater circuit is taken from the collector 154 of transistor 152 and fed directly to the "read" contacts (designated by X—X in FIG. 2) of the tape reader. Since the control system uses an eight-channel reader there are eight sets of read contacts which the interrogate multivibrator feeds.

The output of the "read" contacts is directed to specific logic drive circuits, one of which is illustrated in FIG. 2 and designated by numeral 156. The various logic drive circuits 156 correspond to the particular code that is being read by the reader. As indicated in FIG. 2, the logic drive circuit there illustrated is represented as the drive circuit for the bit "A". Identical circuits are contained in the control system for the other bits (Ā, B, B̄, C, etc.). Logic drive circuits 156 typically consist of transistors 158, 160 having emitter electrodes 161 and 162 connected directly to the negative 12-volt power supply and collector electrodes 163, 164 connected to the positive 12-volt power supply via resistors 165 and 166, respectively. The input to logic circuit 156 is obtained via the resistor divide network formed by resistors 167, 168.

The particular code that is used in the control system is shown in Table 1 which appears on page 15 of this specification. The filled-in areas represent the various combinations of projectors that may be turned on simultaneously. The indicated code combinations of A, B, C provide the functions of turn on, turn off, dissolve up, dissolve down, change slides, movie on and movie off. Thus, three of the eight channels are used to provide the command functions and the remaining five channels are used to select individual projectors.

Figure 3:
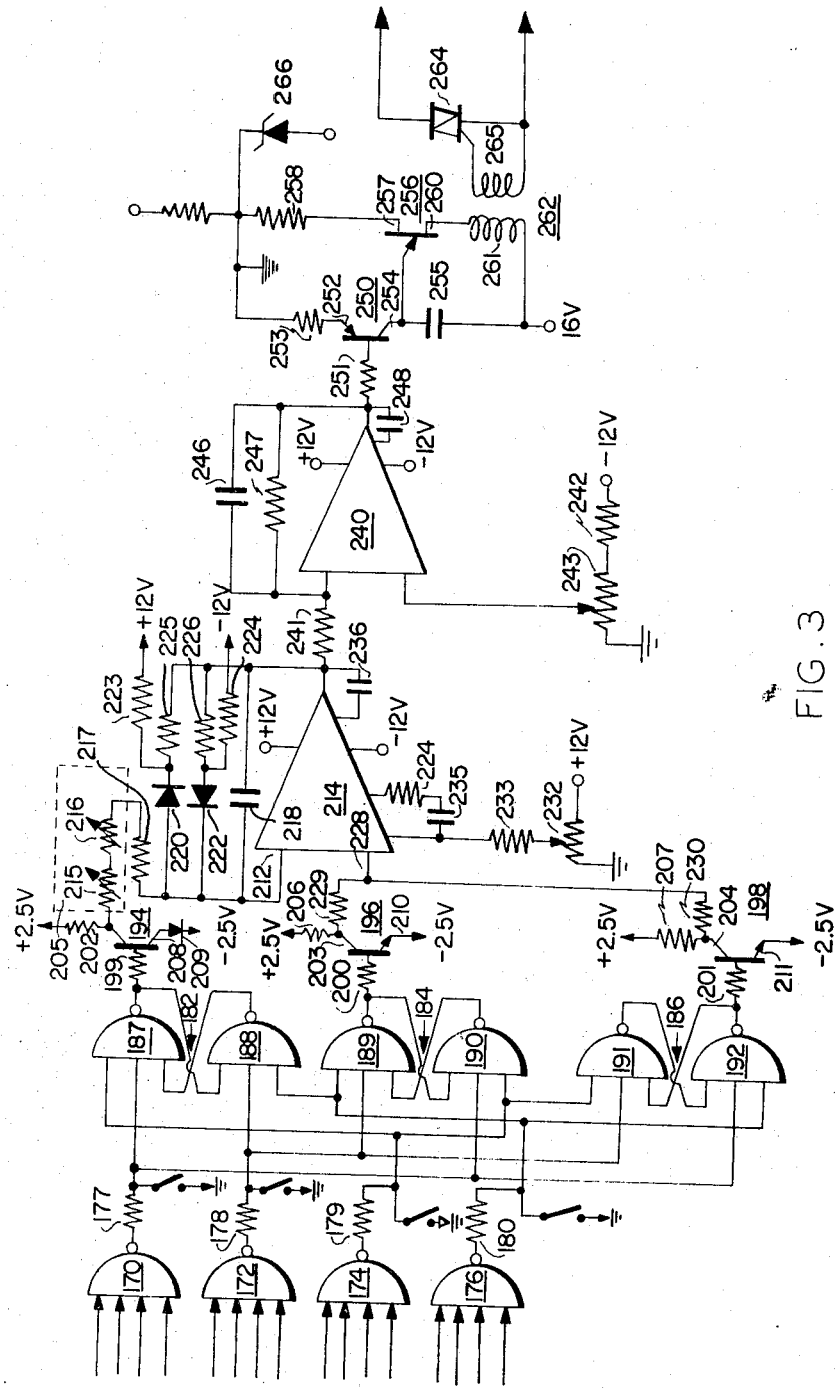
FIG. 3 is a schematic illustrating a preferred embodiment of the dimmer control circuitry for a single channel.

A preferred embodiment of a typical dimmer circuit which is used in each of the five channels requiring control signals for increasing and decreasing the intensity of a lamp is shown in FIG. 3. The "read" pulses from the Tally tape, which are processed by the special logic circuits 156, are fed into NAND-gates 170, 172, 174, 176. A given NAND gate is activated when the proper precoded sequence of pulses are received at its input. The output of the NAND gates are fed via resistors 177, 178, 179, 180 to three, set-reset RS type flip-flops 182, 184, 186 consisting of, respectively, NAND-circuits 187–188, 189–190 and 191–192. The inputs of RS flip-flops 182, 184, 186 are tied together in a logical manner to the above to discriminate between various coded functions of dissolve up, dissolve down, turnon and turnoff. Typically, NAND-gate 170 may provide the desired up function; NAND-gate 172 may provide the dissolve down function; NAND-gate 174 may provide the turnon function; and, NAND-gate 176 may provide the turnoff function.

The outputs of each of flip-flops 182, 184, 186 are fed to transistor switches 194, 196 and 198 via resistors 199, 200, 201, respectively. The respective collector electrodes

TABLE 1.—PROGRAM DIRECTOR CODE

| | | | | | | | | A, B, and C are used for functions as follows— | | | |
|---|---|---|---|---|---|---|---|---|---|---|---|
| A | B | C | D | E | F | G | H | A | B | C | |
| 0 | 0 | 1 | 0 | 0 | 0 | 0 | 1 | 0 | 0 | 1 | —Turn on. |
| | | | 0 | 0 | 0 | 1 | 0 | 0 | 1 | 0 | —Turn off. |
| | | | 0 | 0 | 0 | 1 | 1 | 0 | 1 | 1 | —Dissolve up. |
| | | | 0 | 0 | 1 | 0 | 0 | 1 | 0 | 0 | —Dissolve down. |
| | | | 0 | 0 | 1 | 0 | 1 | 1 | 0 | 1 | —Change slides. |
| | | | 0 | 0 | 1 | 1 | 0 | 1 | 1 | 0 | —Movie on. |
| | | | 0 | 0 | 1 | 1 | 1 | 1 | 1 | 1 | —Movie off. |
| | | | 0 | 1 | 0 | 0 | 0 | 0 | 0 | 0 | —Extra. |
| | | | 0 | 1 | 0 | 0 | 1 | | | | |
| | | | 0 | 1 | 0 | 1 | 0 | | D, E, F, G, H are projector | | |
| | | | 0 | 1 | 0 | 1 | 1 | | | | |
| | | | 0 | 1 | 1 | 0 | 0 | | Selectors | | |
| | | | 0 | 1 | 1 | 0 | 1 | | D—P₁ | | |
| | | | 0 | 1 | 1 | 1 | 0 | | E—P₂ | | |
| | | | 0 | 1 | 1 | 1 | 1 | | F—P₃ | | |
| | | | 1 | 0 | 0 | 0 | 0 | | G—P₄ | | |
| | | | 1 | 0 | 0 | 0 | 1 | | H—P₅ | | |

TABLE 1.—PROGRAM DIRECTOR CODE — Continued

| | | | | | | | | A, B, and C are used for functions as follows— | | |
|---|---|---|---|---|---|---|---|---|---|---|
| A | B | C | D | E | F | G | H | A | B | C |
| 1 | 0 | 0 | 1 | 0 | | | | | | |
| 1 | 0 | 0 | 1 | 1 | | | | | | |
| 1 | 0 | 1 | 0 | 0 | | | | | | |
| 1 | 0 | 1 | 0 | 1 | | | | | | |
| 1 | 0 | 1 | 1 | 0 | | | | | | |
| 1 | 1 | 0 | 0 | 0 | | | | | | |
| 1 | 1 | 0 | 0 | 1 | | | | | | |
| 1 | 1 | 0 | 1 | 0 | | | | | | |
| 1 | 1 | 0 | 1 | 1 | | | | | | |
| 1 | 1 | 1 | 0 | 0 | | | | | | |
| 1 | 1 | 1 | 0 | 1 | | | | | | |
| 1 | 1 | 1 | 1 | 0 | | | | | | |
| 1 | 1 | 1 | 1 | 1 | | | | | | |

202, 203, 204 of transistors 194, 196, 198 are connected to the positive 2½-volt power supply via resistors 205, 206, 207, respectively. Emitter 208 of transistor 194 is connected to the negative 2½-volt power supply via diode 209. Emitters 210, 211, of transistors 196, 198 are connected directly to the negative 2½-volt power supply as indicated in FIG. 3. The output of transistor switch 194 is taken from collector 202 and provided to the inverting input 212 of amplifier 214 via variable resistors 215, 216 and fixed resistor 217. Capacitor 218 in the feedback circuit from the output of amplifier 214 provides an integrating function so that the amplifier operates as an integrating amplifier. Diodes 220, 222 are connected in the respective feedback groups shown in FIG. 3 and are respectively connected to the positive and negative 12-volt power supplies via resistors 223, 224; and to the output of amplifier 214 via resistors 225, 226.

The output from collectors 203, 204 of transistors 196, 198, respectively, are commonly applied to noninverting input 228 of amplifier 214 via resistors 229, 230. The signal levels that are provided into inverting input 212 are used to cause a smoothly varying voltage on the output of integrating amplifier 214; and the signal levels that are fed into the noninverting input 228 are used eventually as snap-action on-off switching of the lamp circuits. The initial bias level of amplifier 214 is established via variable resistor 232 which is connected to the positive 12-volt power supply and to the amplifier via resistor 233. The positive and negative 12-volt connections to the amplifier 214 are indicated in FIG. 3. Capacitor 236 is connected from the chassis of amplifier 214 to its output and provides a decoupling function for the output signal of the amplifier.

The output voltage excursions of amplifier 214 are fed to operational amplifier 240 through resistor 241. The initial bias level for amplifier 240 is provided by fixed resistor 242 and variable resistor 243 by the negative 12-volt power supply. Amplifier 240 operates as an integrating amplifier by means of the feedback networks formed by capacitor 246 and resistor 247. Capacitor 248 is connected to the chassis of amplifier 240 and to its output to decouple the output of the amplifier. Positive and negative 12-volt power is connected to amplifier 240 as shown in FIG. 3. Amplifier 240 increases the sensitivity of the dimmer circuitry and operates transistor switch 250 via input resistor 251. Emitter electrode 252 of transistor 250 is connected to ground through resistor 253 and, collector 254 of transistor 250 is connected to a negative 16-volt supply. Transistor switch 250 acts as a variable impedance to control the charging of capacitor 255 and thereby the activation of unijunction transistor 256 to operate the triac 264 from secondary 265 of transformer 262 to provide the necessary control signal for performing the functions of dissolve up, dissolve down, turn off, and turn on. Zener diode 266 provides a fixed reference coding operation of unijunction transistor 256.

FIG. 4 illustrates a preferred embodiment of a typical circuit for changing slides as indicated by change slide circuits 25, 27, 29, 31 and 33 of FIG. 1. Coded logic pulses, for example, E, A, B̄, C are provided as inputs to NAND-gate 270. The coded inputs D, A, B̄, and C are provided to NAND-gate 272 the output of which goes to channel 1. Similar NAND gates with appropriate logic inputs are provided for the other channels. The output of NAND-gate 270 is fed to base 273 of transistor 274 via series connected capacitor 275 and resistor 276. Collector 277 of transistor 274 is coupled via capacitor 278 to base 279 of transistor 280; and, collector 281 of transistor 280 is cross-coupled to base 273 via resistor 282. Base 279 is connected to a negative 2½-volt power supply via resistor 283 and manual switch 284. Emitters 285, 286 of transistors 273, 280, respectively, are connected to the negative 2½-volt power supply via emitter resister 287. Base 273 and the output of NAND-gates 270 are connected to the negative 2½-volt power supply via resistors 281 and 289, respectively. Collectors 277 and 288 are connected to a positive 2½-volt power supply via resistors 290 and 291; and base 279 is also connected to the same power supply via resistor 292. The proper code input to NAND-gate 270 triggers the monostable multivibrator formed by transistors 274 and 280 to provide activation of driver switch 294 via resistor 295 which connects the base of transistor 294 to collector 281 of transistor 280. Driver switch 294 may also be activated by operation of the manual advance switch 284. Clairex photocell-lamp module 296 is activated by driver switch 294 to control lamp 297 in the photo module and which, in turn, provides excitation to turn on silicon control rectifier 298 to provide the necessary output signals at terminals 299, 300 to advance the slide tray of a projector, for example. Resistor 301 interconnects trigger gate 302 of SCR 298 to its cathode 303.

The circuit shown in FIG. 4B is used for reversing the slide, for example, and is manually operated by pushbutton switch 306 and may be connected to lamp 297a within photo mod 296a via resistor 307. The activation of pushbutton switch 306 turns on the SCR 298a to provide the necessary signal at terminals 299, 300 to reverse the slide tray.

A preferred embodiment of a typical movie projector control circuit is illustrated in FIG. 5 and consists of on-off logic circuit 310, RS flip-flop circuit 312, unijunction trigger circuit 314 and a movie triac control switch 316. The movie projector control circuit receives its commands from the punch tape via the tape reader. The commands are A, B, C̄, for "on" and Ā, B, C for "off" (reference Table 1 page 15.) The on-off logic circuitry comprises two NAND-gates 317, 318 which are connected to respective inputs of RS flip-flop 312 via resistors 319, 320. RS flip-flop 312 consists of two cross-coupled gates 321, 322, which may be manually controlled to provide on-off actuation by operation of manual switches 323, 324, respectively.

The output of RS flip-flop 312 is provided to base 324 of transistors 326 in unijunction trigger circuit 314 through resistor 327. Collector 328 of transistor 326 is connected to the emitter electrode 329 of unijunction transistor 330 and to the 16-volt power supply via capacitor 331. Emitter electrode 332 of transistor 326 is connected to ground via resistor 333. The upper base electrode 334 of unijunction transistor 330 is connected to ground via resistor 335; and, lower base electrode 336 of unijunction transistor 330 is connected to the 16-volt power supply through primary coil 337 of transformer 338. Transistor 326 functions as a variable impedance to control the charging time of capacitor 331 which activates unijunction transistor 330 to provide the necessary pulse on primary coil 337 of transformer 338 to operate triac switch 340 in movie switch circuit 316. Triac switch 340 is activated by secondary coil 341 of transformer 338 and is connected to the projector lamp via resistor 342 and coil 343 via terminal 344 which provides excitation to the movie projector. Terminal 345 is connected to the other end of the triac switch 340.

The output of on-off gate 310 operates RS flip-flop 312 to latch transistor 326 in either on or off state whereby the operation of unijunction transistor 330 may be controlled by the charge built up on capacitor 331.

Figure 6:
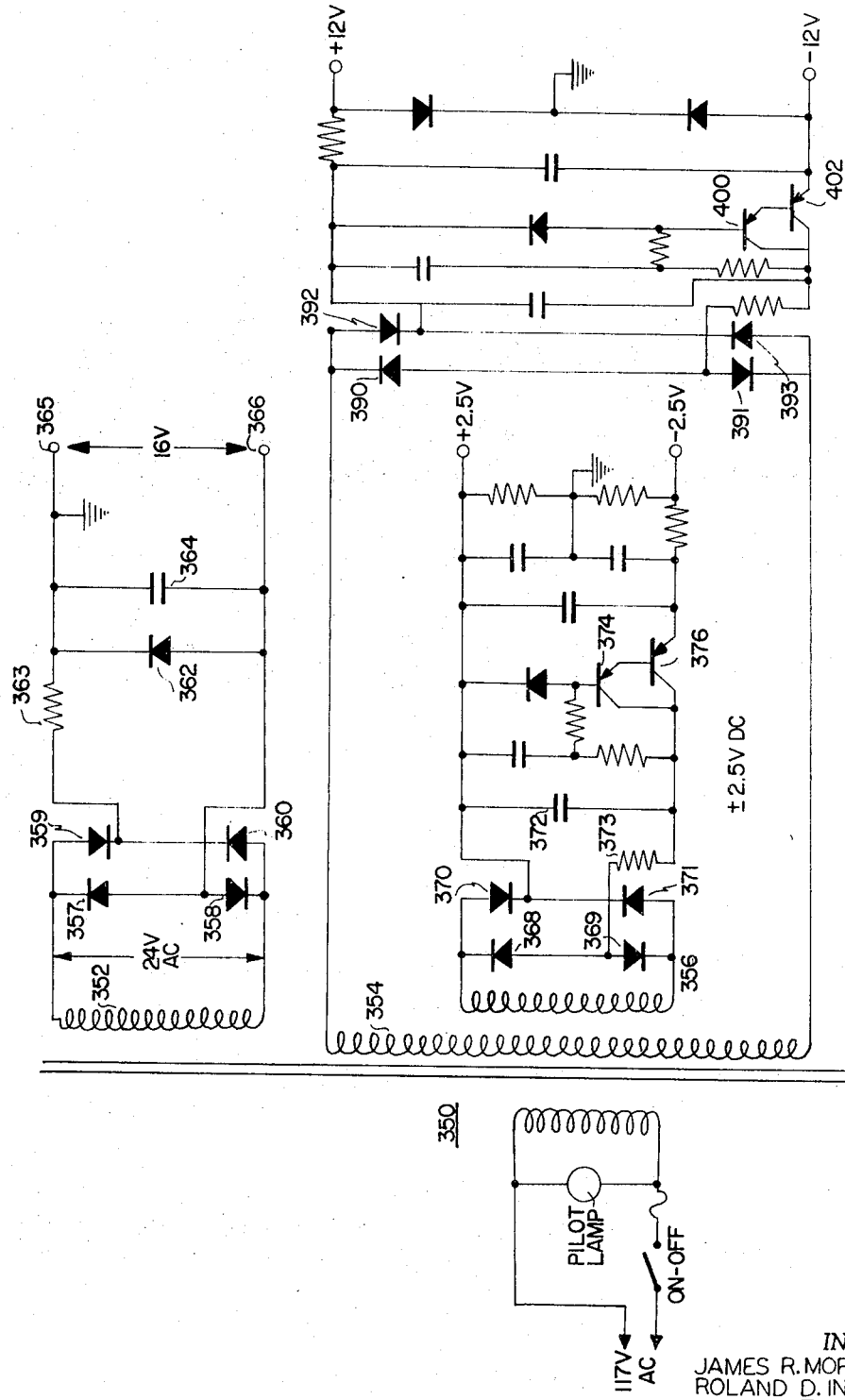
FIG. 6 illustrates a power supply for providing the necessary voltages to operate the various components of the automatic control system.

A preferred embodiment of a power supply circuit for the control system is shown in FIG. 6. Power is derived from a 117 volt, 60 Hz., 2.5 a. transformer 350 which includes three separate windings 352, 354, 356 to provide respective inputs for three separate voltage sources. The 16-volt unfiltered source which is excited by winding 352 furnishes rectified but unfiltered alternating current to all of the unijunction trigger circuits. The diodes 357, 358 and diodes 359, 360 form a diode bridge as shown in FIG. 6 across winding 352. A connection is made at the anode of diode 358 and the cathode of diode 359 to provide excitation to Zener diode 362 which maintains the regulation of the 16-volt unfiltered voltage. Resistor 363 is provided to determine the operating point of Zener diode 362 and capacitor 364 is connected in parallel to Zener diode 362 across output terminals 365, 366.

The positive and negative 2½-volt DC source is well filtered and highly regulated by means of a transistor regulator. The primary input power to this voltage source is provided via winding 356 and diodes 368, 369 and 370, 371 which form a bridge network. Capacitor 372 is connected across the output of the diode bridge through resistor 373. Regulating transistors 374, 376 are connected as shown in FIG. 6. The structure and operation of the remaining circuit components is well known to the art and requires no further description for the purposes of this invention.

The positive and negative 12-volt DC source supplies power primarily to the operational amplifiers and is excited from winding 354 which includes diodes 390, 391 and 392, 393 connected as a bridge across its terminals. The positive and negative 12-volt DC source is regulated by transistors 400, 402 which are connected as shown in FIG. 6.

The output from both the positive and negative 2½-volt DC and the positive and negative 12-volt DC sources are connected at a common midpoint to provide voltages above and below ground. The common midpoint connection is required to operate the integraters in the dimming circuits.

Those skilled in the art will recognize other modifications of the apparatus. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

What we claim is:

1. Apparatus for generating a plurality of diverse control signals for operating lighting and display equipment, comprising;
   means for interpreting successive coded programmed signals,
   means for converting said coded signals into initial control signals in each of a plurality of individual control channels,
   means for generating operating signals for controlling said means for interpreting,
   and means in the channels responsive to said operating signals for providing a plurality of diverse final control signals,
   said means for generating operating signals includes means for generating repetitive interrogation signals and means for integrating said interrogation signals to initiate said means for providing a plurality of diverse final control signals.

2. Apparatus according to claim 1 wherein the repetitive interrogation signals consist of tone bursts having a predetermined duration and said means for integrating includes an active band-pass filter and capacitor means for storing the integrated signals.

3. Apparatus according to claim 1 wherein said means for generating operating signals further includes switching means responsive to the signal stored by said capacitor means and said switching means includes monostable multivibrator circuits.

4. Apparatus according to claim 3 wherein said switching means further include logic circuits individually responsive to a selected code arrangement in said coded programmed signals.

5. Apparatus for generating a plurality of diverse control signals for operating lighting and display equipment, comprising;
  means for interpreting successive coded programmed signals,
  means for converting said coded signals into initial control signals in each of a plurality of individual control channels,
  means for generating operating signals for controlling said means for interpreting,
  and means in the channels responsive to said operating signals for providing a plurality of diverse final control signals,
  said means for providing a plurality of diverse final control signals include means for discriminating between said operating signals, means for providing continuous output signals in accordance with the discriminated signals, and means for actively integrating and amplifying said continuous output signals.

6. Apparatus according to claim 5 wherein said means for generating operating signals includes means for generating repetitive interrogation signals and means for integrating said interrogation signals to initiate said means for providing a plurality of diverse final control signals.

7. Apparatus according to claim 5 wherein said means for discriminating include a plurality of gates each responsive to a preset code pattern of said coded programmed signals and said means for actively integrating and amplifying include operational integrating amplifiers.

8. Apparatus according to claim 7 wherein said means for providing a plurality of final control signals includes oscillator means controlled by the integrated and amplified continuous output signals and switching means responsive to said oscillator means to operate a dimmer light control circuit.

* * * * *